Feb. 26, 1963  J. J. WHITE  3,078,594
SERVO ASSIST BUNGEE
Filed Nov. 18, 1960
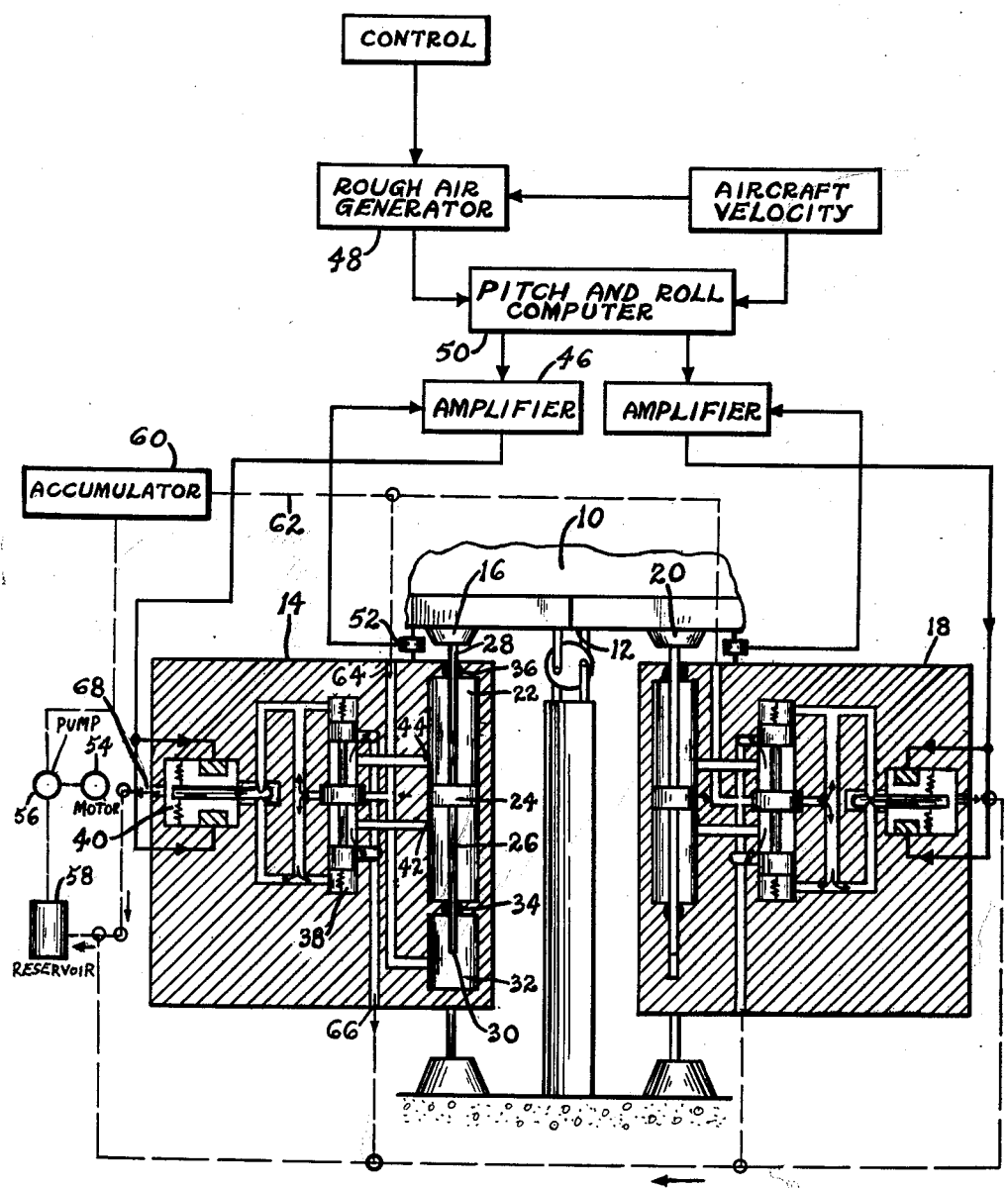
INVENTOR.
JOHN J. WHITE
BY
Lawrence S. Epstein
ATTORNEY

United States Patent Office 3,078,594
Patented Feb. 26, 1963

3,078,594
SERVO ASSIST BUNGEE
John J. White, Bethesda, Md., assignor, by mesne assignments, to the United States of America as represented by the Secretary of the Navy
Filed Nov. 18, 1960, Ser. No. 70,362
3 Claims. (Cl. 35—12)

This invention relates to servo mechanisms and more particularly to electro-hydraulic mechanisms used to rapidly position heavy objects such as the cockpit of a flight trainer.

In a hydraulic servo system used to rapidly position a heavy object in a vertical direction it is obvious that mass of the object being positioned has detrimental effects upon the operation of the servo system. In the past, efforts to overcome the effect of dead weight upon servo valve operations have depended on the use of springs having a very low spring rate which are placed under the object to balance the weight of the object. A spring of this nature tends to be bulky and cumbersome and affects the response of the system. In the present invention the desired result is accomplished by placing an auxiliary or bungee cylinder under the object so proportioned that the effective operating area times the fluid pressure in the cylinder equals the weight of the object being positioned. Such a compensator effectively provides relief from the effects of gravity while not having any of the disadvantages of springs.

Thus, it is an object of this invention to provide a hydraulic weight compensator for hydraulic servo valves.

Another object of this invention is to provide weight compensation for servo valves which does not have the known disadvantages of springs used for weight compensation.

Still another object of this invention is to provide better weight compensation for servo systems than has previously existed.

Other objects and many of the attendant advantages of this invention will be readily appreciated as the same becomes better understood by reference to the following detailed description when considered in connection with the accompanying drawing wherein the sole figure represents a semi-diagrammatic presentation of the invention.

Referring now to the figure which shows a cockpit section 10 pivoted at a point 12 approximately on a line with normal center of gravity of the aircraft. Movements simulating roll, pitch and buffeting are produced by two hydroelectric actuators. The first actuator, 14, mounted at the center of the aft part of the cockpit structure 16, provides pitching and buffeting effects; the second actuator 18, installed at a point 20 laterally displaced from the pivot 12, supplies rolling effects.

The pitch hydraulic servo contains a main cylinder 22 having a piston 24 which divides the cylinder into two chambers. A shaft 26 is provided so that the motion of this piston may be used to perform a useful function. For this reason one extremity 28 of this shaft is coupled to the cockpit. For weight compensating purposes the other end 30 extends into auxiliary or bungee cylinder 32. Seals 34 and 36 are used to minimize passage of oil through the orifices provided for the shaft.

A valve 38 having an appropriate actuating electromagnetic transducer 40 such as a torque motor and flapper valve controls the flow of hydraulic fluid through the main cylinder ports 42 and 44 permitting control of the main actuator piston by the insertion of electrical signals into the electromagnetic transducer. A servo amplifier 46 supplies signals for this purpose. These signals are the result of a comparison of the outputs of a computer 50 producing signals simulating the pitching motion of the craft and a feedback potentiometer 52 measuring the movements of the cockpit coupled between the actuator and the load.

The roll axis differs from the pitch axis in that it is an axis of symmetry and thus has no need for a weight compensating bungee. Also, differences in the aerodynamic response of the axes requires the roll computer to produce signals which will impart a motion to the cockpit simulating the rolling motions of the craft instead of resembling those from the pitch computer whose resemblance to aircraft pitching motions make them undesirable for producing rolling motion. In other ways, the roll actuator is similar to the pitch and thus does not necessitate further separate discussion.

The pressure for the hydraulic components is maintained by a motor 54 which drives a pump 56 having an appropriate reservoir 58 and accumulator 60. Hydraulic fluid from the pump is directed along pipes 62 to openings 64 in the actuator. Through a series of passages within the servo fluid pressure is directed to different parts of the actuator for its proper operation and transported to outlets 66 and 68 for its return to the reservoir 58.

In operation a pump 56 pumps hydraulic fluid under pressure to the main 22 and auxiliary 32 chambers. The auxiliary chamber 32 provides weight compensation since it has been designed so that the pressure in it multiplied by the effective area of the shaft 26 on which this pressure is exerted equals the weight which the cockpit exerts on the actuator 18. Signals from the hydraulic amplifier 46 position the flapper valve of the electromagnetic transducer 40 producing an imbalance in the pressures acting on the ends of the spool of the valve 40 causing it to move and in so moving imbalance the pressure exerted on the main piston 24 by porting of fluids through the port orifices 42 and 44. This causes the piston 24 to move in the direction of lower pressure. Thus, the shaft 26 moving in response to the piston exerts pressure on the cockpit section at point 16 vibrating the cockpit in response to the input signals from the amplifier 46. Movements of the cockpit with respect to the hydraulic servo elicits signals out of the potentiometer 52 which are fed into the amplifier 46 to complete the servo loop.

Obviously many modifications and variations of the present invention are possible in the light of the above teachings. It is therefore to be understood that within the scope of the appended claims the invention may be practiced otherwise than as specifically described.

What I claim is:
1. A cockpit motion simulator system comprising, an actuator chamber,
valve means in said actuator chamber,
means to actuate said valve means,
a cylinder in said actuator chamber,
said cylinder including a piston and shaft, thereby subdividing said cylinder,
a bungee chamber axially aligned with said cylinder, said shaft extending into said bungee chamber,
a source of fluid supply,
means connecting said fluid supply source to said valve means,
means connecting said fluid supply source to said bungee chamber,
fluid supply return means connecting said valve means and said bungee chamber,
conduit means connecting said valve means and said subdivided cylinder chambers to supply fluid to said chambers,
extension means on said shaft extending beyond said cylinder and adapted to engage a simulator cockpit for simulating the pitch of an aircraft,
and means connected to said fluid supply source ac- tuating said fluid supply to provide fluid to said cylinder and to said bungee chamber, whereby a differential in pressure in said subdivided cylinder chambers causes said shaft to move and to actuate the cockpit in pitch motion simulation.

2. The combination of claim 1 wherein said last named means comprises an amplifier, a feedback potentiometer connecting said amplifier means and said actuator, and a pitch computer providing signals to said amplifier to simulate pitch motion of a cockpit.

3. The combination of claim 2 wherein said simulator includes a second actuator chamber, and means in said actuator chamber connected to said source of fluid supply whereby roll of a cockpit is simulated.

References Cited in the file of this patent
UNITED STATES PATENTS

| | | |
|---|---|---|
| 1,619,474 | Hubbard | Mar. 1, 1927 |
| 2,414,979 | Ross | Jan. 28, 1947 |
| 2,506,093 | MacDuff | May 2, 1950 |
| 2,524,238 | Soule | Oct. 3, 1950 |